Figure 1:
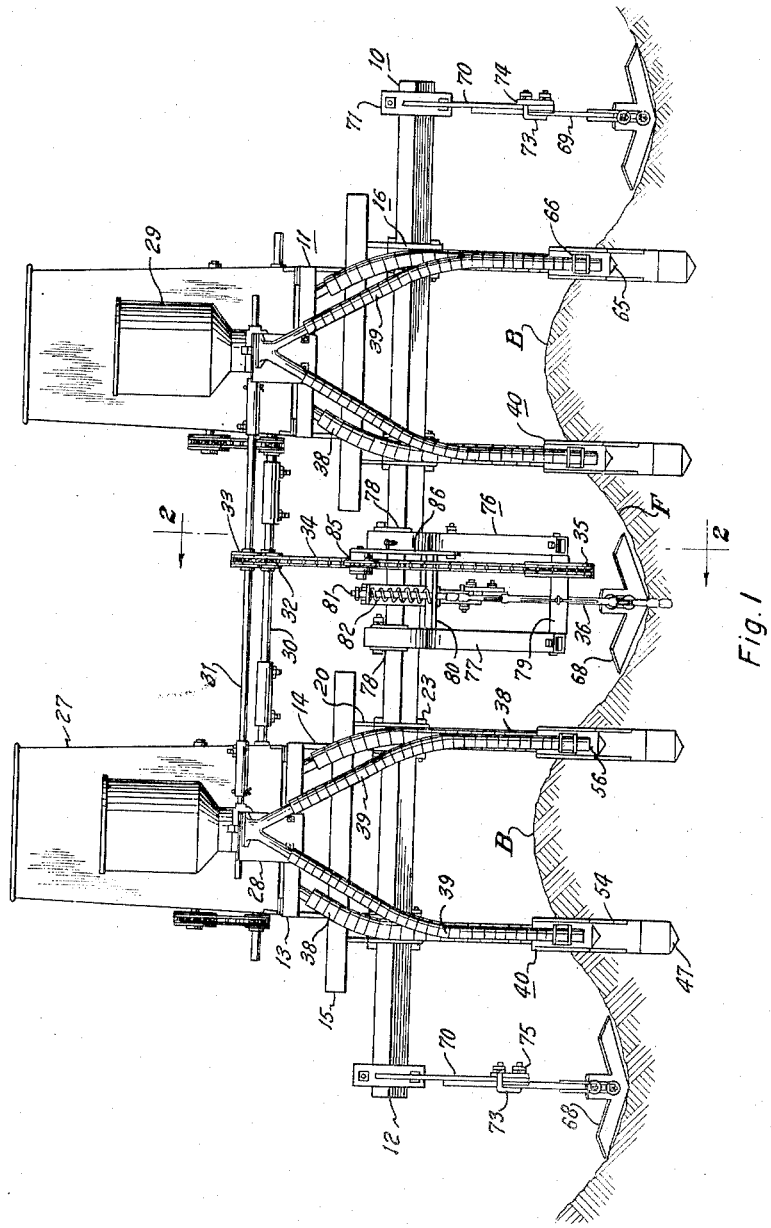

INVENTOR
Johnnie C. Collins
BY Ashley & Ashley
ATTORNEYS

Sept. 25, 1956
J. C. COLLINS
2,764,111
FERTILIZING IMPLEMENT
Filed Nov. 26, 1954
3 Sheets-Sheet 3
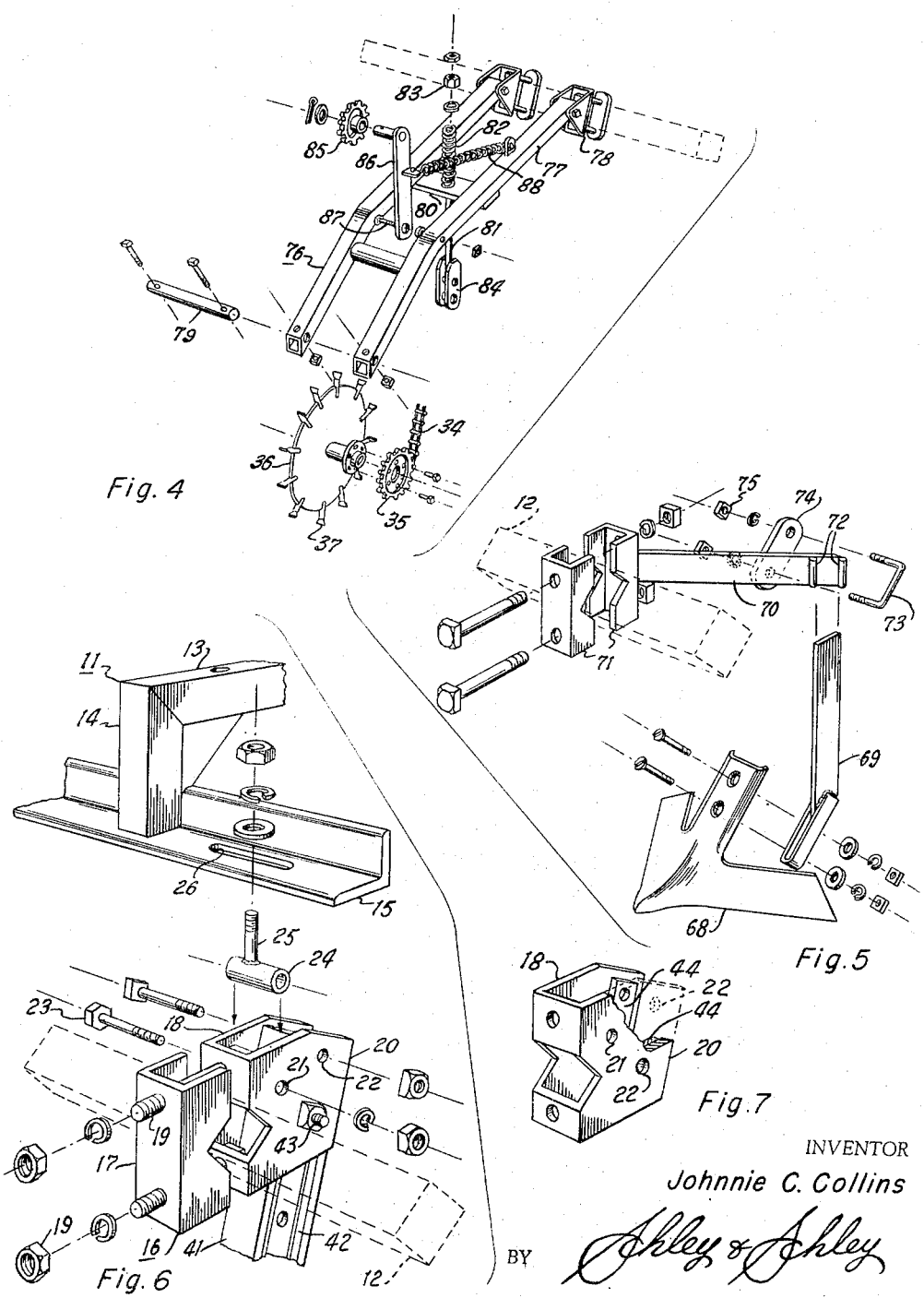
INVENTOR
Johnnie C. Collins
BY Ashley & Ashley
ATTORNEYS United States Patent Office 2,764,111
Patented Sept. 25, 1956

2,764,111
FERTILIZING IMPLEMENT

Johnnie C. Collins, Dallas, Tex., assignor to Servis Equipment Company, Dallas, Tex., a corporation of Texas Application November 26, 1954, Serial No. 471,336

2 Claims. (Cl. 111—70)

This invention relates to new and useful improvements in fertilizing implements.

It has been found that soil may be enriched by the deep application of fertilizer while simultaneously planting a leguminous plant, such as vetch or clover, which further enriches the soil due to its inherent characteristic of producing nitrogen. The fertilizer is deposited and the seed planted in bedded land, preferably on the sides of the beds, in the fall for growing of the legume during the winter months or non-growing season to provide a cover crop which eliminates erosion and retains moisture in the soil by reducing surface evaporation. In the spring or prior to planting the major crop, such as corn or cotton, the leguminous plant is cut and deposited in the furrows to clear the beds for the planting of said major crop. A healthy, deep-growing root system of the major crop is assured by the increased nitrogen and moisture well below the surface of the soil. The soil, particularly tight soil, is improved by working the surface vegetation of the leguminous plant into the soil so as to aerate or loosen the same. Also, the growth of the major crop is assisted by side-dressing, that is, depositing fertilizer in the sides of the beds, during early growth. In addition to substantially increasing the yield of the major crop, the condition of the soil is materially improved for future crops.

Therefore, one object of the invention is to provide an improved fertilizing implement arranged to deposit fertilizer in soil contiguous to seed for improving the fertility of the soil.

Another object of the invention is to provide an improved fertilizing implement having novel means for deeply applying fertilizer in each side of the bed simultaneously with the planting of a leguminous plant above and contiguous the fertilizer to enrich the soil.

A particular object of the invention is to provide an improved fertilizing implement having means associated with a furrow opener and adjustable in accordance with the condition of the soil to control and maintain the desired filling of the furrow and covering of the fertilizer to permit the planting of seed in said furrow in the proper spaced relation to said fertilizer.

An important object of the invention is to provide an improved fertilizing implement, of the character described, wherein the means for controlling the filling of the furrow is adjustable independently of the furrow opener and carries seed planting means for coacting therewith.

A further object of the invention is to provide an improved fertilizing implement having upright plates for controlling the falling of soil into a furrow from the sides thereof and pivotally mounted rearwardly of and in coacting relation to the trailing edges of a deep furrow opener, the plates being adjustable independently of the opener for different soil conditions and arranged to support drop tubes for fertilizer and seed as well as a shallow furrow opener for the seed.

A construction designed to carry out the invention will be hereinafter described, together with other features of the invention.

Figure 2:
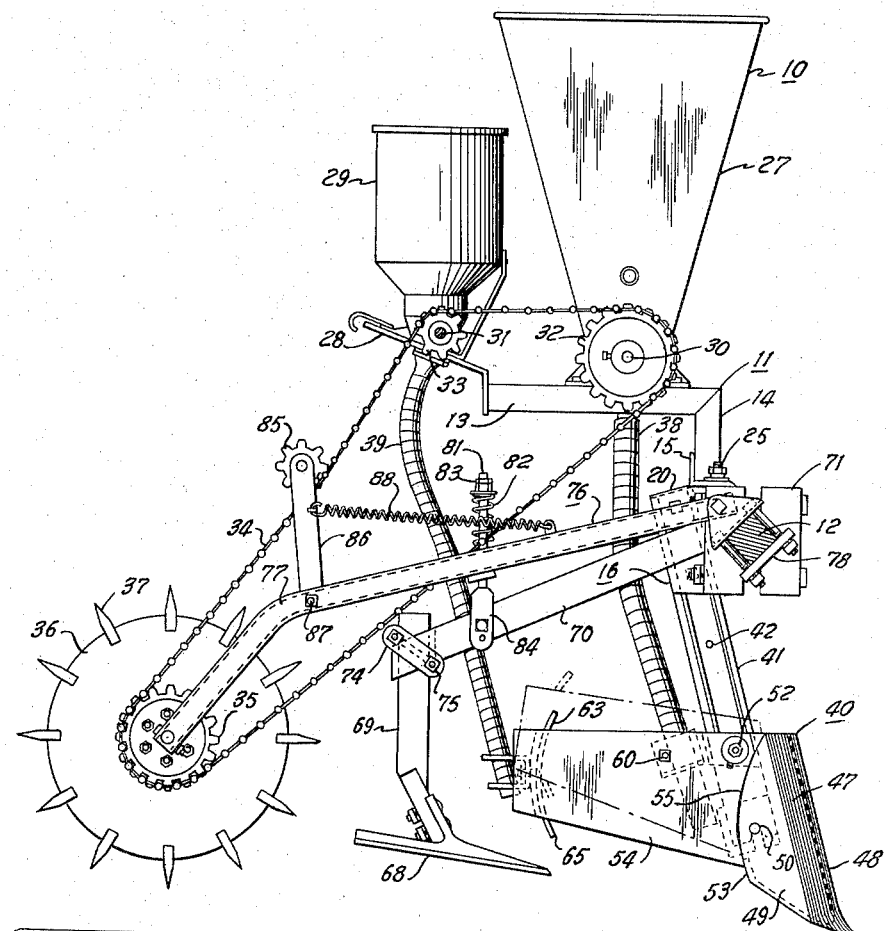
Figure 3:
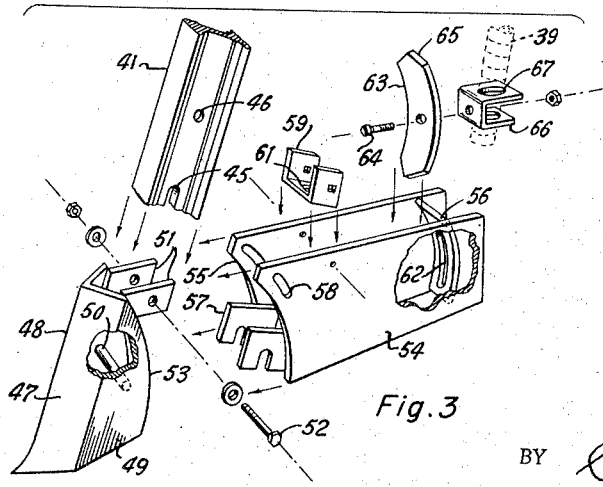

The invention will be more readily understood from a reading of the following specification and by reference to the accompanying drawings, wherein an example of the invention is shown, and wherein:

Fig. 1 is a rear elevational view of a fertilizing implement constructed in accordance with the invention, Fig. 2 is a transverse, vertical, section view, taken on the line 2—2 of Fig. 1, Fig. 3 is an exploded, perspective view of one of the furrow openers showing its plow, coacting side plates and other elements, Fig. 4 is an exploded, perspective view, showing the mounting of the ground drive wheel, Fig. 5 is an exploded, perspective view showing the mounting of one of the covering sweeps, Fig. 6 is an exploded, perspective view showing the mounting of one of the brackets and furrow openers, and Fig. 7 is a perspective view, partly in section, showing the shoulder plates of the brackets.

In the drawings, the numeral 10 designates a fertilizing implement having one or more angular brackets or frames 11 adapted to be mounted on a conventional, transverse tool bar 12 for connection with a tractor (not shown). Each frame includes a horizontal, rectangular portion 13 having upright legs or supports 14 extending between its front margin and an underlying, transverse angle bar 15. A pair of clamps 16 are mounted in spaced relation on the tool bar 12 below each angle bar 15 and each clamp has a pair of U-shaped elements or plates 17 and 18 fastened on said tool bar by suitable bolts and nuts 19 (Fig. 6). The rear clamp plate 18 has rearwardly-directed flanges 20 with alined openings 21 and 22 formed therein. A bolt 23 extends through the openings 21 for confining a collar or sleeve 24 between the flanges 20 and each sleeve has a screw-threaded stud 25 extending radially therefrom and through an elongated, longitudinal opening or slot 26 formed in each end of the angle bar 15 whereby said angle bar is adjustably fastened to the tool bar 12 for supporting the frame 11, the bolts and studs having the usual nuts and washers. A fertilizer box 27 is mounted on the horizontal frame portion 13 and an angular bracket 28 is secured to the rear margin of said frame portion for supporting a seed box 29 (Fig. 2). Agitator shafts 30 and 31 extend between and connect the boxes 27 and 29, respectively, and carry sprockets 32 and 33 between said boxes for driving engagement by an endless chain 34 to a sprocket 35 mounted on the hub of a ground drive wheel 36 having radial lugs 37 and adapted to ride in a furrow F between beds B, as will be described hereinafter. A pair of conventional drop tubes 38 and 39 depend from the boxes 27 and 29, respectively, in the usual manner.

A pair of furrow openers 40 are provided for each frame 11 and are mounted in parallel, spaced relation to each other for opening a deep, narrow furrow on each side of a bed B (Fig. 1). Each opener includes a downwardly and forwardly inclined plow beam or support 41 having longitudinally-spaced, transverse openings 42 in its upper portion for registering with the openings 22 of the clamp plates 20. Suitable bolts 23 and nuts 43 coact with the openings to fasten the beam to the clamp plates. Since the beam is I-shaped in cross-section, internal, shoulder plates 44 are carried by the clamp plates for engaging and confining the web of said beam therebetween to support the load imposed thereupon said beam by the opener (Fig. 7). Due to the provision of at least three openings 42 in the upper portion of the beam, the elevation of the opener 40 may be varied. A transverse groove or open slot 45 is formed in the lower end of the beam 41 and coacts with an opening 46 thereabove for connecting the opener to said beam. As shown most clearly in Fig. 3, the opener has an upstanding, V-shaped blade or plow 47 at its forward end with a central, leading edge 48 and parallel, spaced plate or wings 49 extending rearwardly from its trailing edges. A pin 50 extends transversely between the intermediate portions for the wings for engagement with the slot 45 of the beam, while a pair of apertured ears or lugs 51 extend rearwardly from the upper portions of the trailing edges for registration with the opening 46 to receive a fastening bolt and nut 52. As a result, the plow 47 is supported by the beam with its leading edge 48 inclined rearwardly and upwardly. It is noted that the lower margins of the plow and wings 49 are similarly inclined at an actute angle to the leading edge and the rear, upright margins of said wings are arcuate as shown by the numeral 53, being swung on a large radius about a horizontal axis forwardly of the plow.

A pair of upright, side members or plate 54 extend longitudinally rearward from and in alinement with the wings and have front margins 55 complementary to the arcuate, rear margins 53 of said wings. The side plates have their rear end portions connected by an arcuate or curved, upright cross-plate 56, while a slotted lug or hook element 57 projects from the lower portion of each plate front margin 55 to engage over the transverse pin 50 of the plow. For registering with the opening 46 and receiving the bolt 52 to adjustably connect the side plates 54 to the beam 41, an arcuate slot 58 is formed in the upper portion of each plate adjacent its front margin and has a concentric curvature. Due to the arcuate margins 53 and 55, the side plates may be swung and adjusted relative to and independently of the plow 47. It is noted that the lower margins of the side plates are inclined upwardly and rearwardly and are disposed above the inclined, lower margins of the wings 49. A U-shaped bracket or clip 59 is supported between the upper portions of the side plates rearwardly of the slots 58 by a transverse bolt and nut 60 and has an opening 61 for receiving the lower portion of the fertilizer drop tube 38 whereby the lower end of said tube may be positioned immediately behind the intermediate portion of the plow as shown by broken lines in Fig. 2. The curved cross-plate 56 has a longitudinal slot 62 for adjustably supporting an overlying, complementary opener blade 63 by a bolt and nut 64. Each end 65 of the opener blade is pointed or tapered to permit reversal of said blade. A U-shaped bracket or clip 66, having openings 67 for receiving the lower portion of the seed drop tube 39, is fastened to the rear surface of the cross-plate by the bolt and nut 64 whereby the lower end of said tube may be positioned immediately behind the opener blade 63. Due to the upward, rearward inclination of the lower margins of the side plates 54, it is manifest that the lower end of the opener blade and seed drop tube are disposed above the lower end of the plow 47.

Since the openers 40 are mounted for engagement with the soil on each side of a bed B, the plows of said openers are adapted to open deep, narrow furrows in the sides of the beds for the reception of fertilizer supplied from the box 27 through the drop tube 38. The side plates 54 coact with the wings 49 of the plow to control the filling of the furrow opened by said plow and have their lower forward end portions disposed in said furrow so as to hold the soil from falling thereinto. Due to the upward, rearward inclination of their lower margins, the side plates permit the soil to fall into the furrow and cover the fertilizer upon advancing of the opener and its plow. The pivotal mounting of the side plates, provided by the engagement of the hooks 57 with the transverse pin 50, and the provision of the arcuate slots 58 permit adjustment of said side plates relative to and independently of the plow upon loosening the nut of the bolt 52. As has been explained, the side plates are adjustable about a substantially horizontal axis for raising and lowering their rear end portions to regulate the falling of the soil into the furrow and the covering of the fertilizer. In tight soils, which have a high clay content, the side plates are swung upwardly; while the side plates are swung downwardly in loose or sandy soils which flow more freely. This adjustment is facilitated by the complementary arcuate margins 53 and 55 of the wings and side plates which provide coacting continuity irrespective of the adjustment. The blade 63 is adapted to open a small furrow for receiving seed from the box 29 through the drop tube 39 so as to plant the seed directly over and slightly above the fertilizer. By adjusting the blade, the depth of the seed furrow may be varied in accordance with the nature of the seed. Since the blade is carried by the rear end portions of the side plates, said blade is movable with said plates and is or can be adjusted to prevent uncovering of the fertilizer. Of course, the seed box, its drop tube and the blade 63 are not used when it is desired to side-dress a growing crop by applying fertilizer to the sides of the beds B.

For covering the seed and restoring the contour of the beds B, sweeps 68 are suitably suspended from the tool bar 12 for engagement with the bottoms of the furrows F. Each sweep acts to throw dislodged soil onto both adjacent beds and includes an angular, upstanding shank 69 adjustably connected to the rear end portion of a beam 70 inclined rearwardly and downwardly from a suitable clamp 71 mounted on the tool bar. As shown in Fig. 5, a pair of upright, spaced bars 72 extend transversely of the beam rear end portion for receiving the upper portion of the shank therebetween and a U-bolt 73, plate 74 and nuts 75 coact to clamp said shank to said beam in adjusted positions. The adjustment of the sweep controls its plowing depth in accordance with the height of the beds and the desired covering of the seed.

It is noted that the ground wheel 36 trails one of the sweeps 68, such as the intermediate sweep, and is supported by an angular frame 76 having a pair of spaced, longitudinal arms or members 77 extending rearwardly and downwardly from suitable clamps 78 fastened on the tool bar (Fig. 4). An axle 79 is carried by the rear ends of the frame members for supporting the ground wheel and its sprocket 35 and one or more cross-bars or members 80 extend between and connect said frame members in parallel relation. For resiliently urging the frame members 77 downwardly and maintaining the wheel 36 in engagement with the ground, a rod 81 extends through one of the cross-bars and has a spring 82 confined upon its upper end by a suitable nut 83. The lower end of the rod is pivotally connected by a yoke 84 to the underlying sweep beam 70 and provides a rigid bearing for the downward thrust exerted by the spring. An idler sprocket 85 for maintaining the tautness of the chain 34 is carried by an arm 86 pivotally supported between the rear portions of the frame members on a transverse bolt or pin 87 projecting from one of said members and urged forwardly by a spring 88 connecting the intermediate portions of the arm and one of said frame members.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a fertilizing implement, a furrow opener including an upright V-shaped blade for opening a narrow furrow, a support for the blade, a pair of upright spaced members extending longitudinally of and rearwardly from the blade to control the falling of the soil into the furrow from the sides of the latter, means adjustably connecting the members to the support for pivotal movement relative to said blade about a substantially horizontal axis in accordance with the condition of the soil, and a fertilizer drop tube having its lower end supported between said members adjacent said blade, said blade and members having arcuate engaging margins to permit pivotal adjustment of said members relative to said blade without disengagement of said margins.

2. In a fertilizer implement, a furrow opener including a plow for opening a narrow furrow, an upright beam for supporting the plow, a pair of upright spaced plates extending longitudinally of and rearwardly from the margins of the plow to control the falling of the soil from the sides into the furrow, the plates having pivotal connection with said plow for adjustable movement relative thereto about a substantially horizontal axis in accordance with the condition of the soil, means adjustably connecting said plates to the beam to secure said plates in adjusted positions, and a fertilizer drop tube having its lower end supported between said plates adjacent said plow, said plow including an upright blade V-shaped in cross-section and rearwardly extending wings at the margins of the blade, the plates coacting with and forming continuations of the wings, said wings and plates having complementary engaging margins arched longitudinally to permit pivotal adjustment of said plates relative to said wings.

References Cited in the file of this patent

UNITED STATES PATENTS

| | | |
|---|---|---|
| 513,807 | Martinez | Jan. 30, 1894 |
| 1,400,740 | Gehr | Dec. 20, 1921 |
| 1,474,599 | Martin | Nov. 20, 1933 |
| 1,951,003 | White | Mar. 13, 1934 |
| 2,645,043 | Booton | July 14, 1953 |